US008006909B2

(12) United States Patent
Swiler et al.

(10) Patent No.: US 8,006,909 B2
(45) Date of Patent: Aug. 30, 2011

(54) METHODS OF FORMING AND DETECTING NON-VISIBLE MARKS AND ARTICLES MARKED IN ACCORDANCE WITH THE METHODS

(75) Inventors: Daniel R. Swiler, Washington, PA (US); Terry J. Detrie, Washington, PA (US); Bertram A. Gardner, Apollo, PA (US); David C. Kapp, Gibbsonia, PA (US); Sean T. Weir, Bridgeville, PA (US); Ronald M. Harris, Alpharetta, GA (US)

(73) Assignee: Ferro Corporation, Cleveland, OH (US)

(*) Notice: Subject to any disclaimer, the term of this patent is extended or adjusted under 35 U.S.C. 154(b) by 1100 days.

(21) Appl. No.: 10/597,781

(22) PCT Filed: Jun. 17, 2005

(86) PCT No.: PCT/US2005/021534
§ 371 (c)(1),
(2), (4) Date: Aug. 8, 2006

(87) PCT Pub. No.: WO2006/009873
PCT Pub. Date: Jan. 26, 2006

(65) Prior Publication Data
US 2007/0164117 A1 Jul. 19, 2007

Related U.S. Application Data

(60) Provisional application No. 60/581,503, filed on Jun. 21, 2004.

(51) Int. Cl.
*G06K 19/06* (2006.01)

(52) U.S. Cl. ........................................ 235/491; 235/494

(58) Field of Classification Search .................. 235/494
See application file for complete search history.

(56) References Cited

U.S. PATENT DOCUMENTS

| | | | |
|---|---|---|---|
| 4,359,633 | A | 11/1982 | Bianco |
| 4,504,084 | A | 3/1985 | Jauch |
| 4,540,595 | A | 9/1985 | Acitelli et al. |
| 4,626,445 | A | 12/1986 | Dobrowolski et al. |
| 5,093,147 | A | 3/1992 | Andrus et al. |

(Continued)

FOREIGN PATENT DOCUMENTS

WO WO 97/01156 A1 1/1997

*Primary Examiner* — Seung H Lee
*Assistant Examiner* — Sonji Johnson
(74) *Attorney, Agent, or Firm* — Rankin, Hill & Clark LLP

(57) ABSTRACT

The present invention provides methods of forming and detecting non-visible marks and articles marked in accordance with the methods. In accordance with the methods of the invention, a marking material is applied to a substrate to form a mark that is contrastable from the substrate in one or more regions of the infrared portion of the electromagnetic spectrum. The mark is covered with a film, which can be a bonded coating or a non-bonded covering sheet, that comprises an amount of one or more inorganic pigments such that the film appears opaque in the visible portion of the electromagnetic spectrum but is sufficiently transmissive in one or more regions of the infrared portion of the electromagnetic spectrum to facilitate the detection of the mark covered by the film. The non-visible marks can be applied to articles such as automobile parts, aircraft parts and other articles of manufacture to deter counterfeiting.

35 Claims, 6 Drawing Sheets

U.S. PATENT DOCUMENTS 5,304,789 A * 4/1994 Lob et al. .................... 235/487
5,599,578 A 2/1997 Butland
6,138,913 A 10/2000 Cyr et al.
6,174,360 B1 1/2001 Sliwinski et al.
6,249,339 B1 6/2001 Jung et al.
6,485,557 B1 11/2002 Swiler
6,541,112 B1 4/2003 Swiler et al.
6,813,011 B2 * 11/2004 Gardner et al. ................ 356/71
2001/0005570 A1 * 6/2001 Daniel et al. ................ 430/321
2002/0041968 A1 4/2002 Sada et al.
2003/0157762 A1 * 8/2003 Peterson .................... 438/200

* cited by examiner

METHODS OF FORMING AND DETECTING NON-VISIBLE MARKS AND ARTICLES MARKED IN ACCORDANCE WITH THE METHODS

BACKGROUND OF THE INVENTION

1. Field of Invention

The present invention relates to methods of forming and detecting non-visible marks and articles marked in accordance with the methods.

2. Description of Related Art

Counterfeit goods are often manufactured, distributed, and sold in direct competition with authentic goods. The automotive parts market, for example, is flooded with counterfeit parts that outwardly appear to be authentic, but are not. Counterfeit parts are often not manufactured to the same tolerances and specifications as authentic parts, which can lead to safety and performance concerns. Some counterfeit automotive parts can so closely resemble authentic parts that it is nearly impossible for consumers to ascertain whether the parts are authentic or not.

Various authentication and/or anti-counterfeiting measures have been devised to attempt to combat the counterfeiting problem. For example, printed security labels are sometimes attached to authentic goods. Unfortunately, counterfeiters simply duplicate the printed security labels, including printed security labels that contain elaborate or complex anti-counterfeiting measures such as holographic images. Another problem with printed security labels is that the organic colorants, paper supports and adhesives generally cannot withstand exposure to high temperatures and harsh environmental conditions.

Non-visual markings have also been used to try to differentiate authentic goods from counterfeit goods. For example, some manufacturers apply ultraviolet (UV) fluorescent markings to authentic goods and documents. The markings are generally not visible until exposed to UV radiation whereupon they fluoresce and form a pattern or code that is intended to differentiate authentic goods from counterfeit goods. Unfortunately, conventional UV fluorescent markings and other markings that are contrastable outside of the visible portion of the electromagnetic spectrum are usually formed of organic pigments that can be readily duplicated. In addition, organic pigments are generally not able to withstand exposure to high temperatures and harsh environmental conditions, which makes them impractical for use in some applications such as the authentication of automobile parts.

BRIEF SUMMARY OF THE INVENTION

The present invention provides methods of forming and detecting non-visible marks and articles marked in accordance with the methods. In accordance with the methods of the invention, a marking material is applied to a substrate to form a mark that is contrastable from the substrate in one or more regions of the infrared portion of the electromagnetic spectrum. The mark is covered with a film, which can be a bonded coating or a non-bonded covering sheet, that comprises an amount of one or more inorganic pigments such that the film appears opaque in the visible portion of the electromagnetic spectrum but is sufficiently transmissive in one or more regions of the infrared portion of the electromagnetic spectrum to facilitate the detection of the mark covered by the film. The methods of the invention can be used to form and detect contrastable marks on articles such as automobile parts, aircraft parts and other articles of manufacture.

In another embodiment of the invention, the marking material used to form the mark or the inorganic pigment(s) used in the covering film preferably comprise one or a plurality of inorganic pigments that produce unique spectral curves outside of the visible portion of the electromagnetic spectrum, which in combination function as a “fingerprint” for identifying the particular manufacturer of the goods upon which the coatings are applied. Access to the inorganic pigments that comprise the “fingerprint” can be strictly limited to the particular manufacturer. Thus, the authenticity of a particular article can be readily ascertained simply by comparing the spectral curve of the surface of the article to the known spectral curve or “fingerprint” assigned to the manufacturer of authentic articles. The inorganic pigments used to form the “fingerprint” are stable, meaning that they do not degrade upon exposure to high temperatures and adverse weather conditions.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The present invention provides methods of forming marks on articles that cannot be detected by the unaided human eye but can be readily observed using infrared imaging devices. Thus, the methods of the invention facilitate the formation of infrared detectable marks (e.g., bar codes, logos, product information, authentication codes, and other indicia) on articles of manufacture without adversely affecting the aesthetic appearance of such articles.

Figure 1:
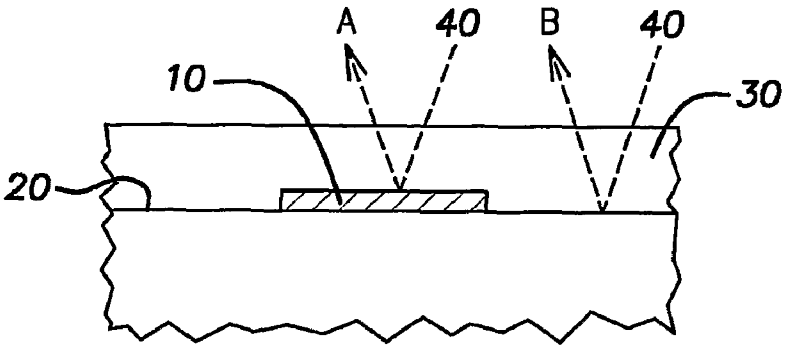
FIG. 1 is a schematic side sectional representation of a first embodiment of a non-visible mark formed on an article according to the invention.

With reference to FIG. 1, which is a schematic side sectional representation of a first embodiment of a non-visible mark formed on an article according to the invention, a mark 10 is formed on a substrate 20. The substrate 20 can be a surface of an article or it can be a surface of a base or primer coating applied to an article. The composition of the substrate 20 is not per se critical, but durable substrate materials such as plastics, wood, metals, glasses and ceramics are preferred.

The mark 10 can be formed using virtually any conventional marking means including, but not limited to, painting, screen printing, ink jet printing, rolling, laser marking, powder coating, stamping and marking with pens. It is also possible to form a contrastable mark by selectively incorporating pigments in the substrate, such as by polymer molding operations. The composition of the material used to form the mark is also not per se critical, but the mark 10 must either reflect or absorb radiation 40 emitted at one or more wavelengths within the near infrared to mid infrared portion of the electromagnetic spectrum (i.e., radiation having a wavelength within the range of from about 0.75 μm to about 40 μm) at a level that is sufficiently different than that of the adjacent substrate 20 such that the mark 10 can be discerned and contrasted from the substrate 20 at such wavelength(s). It is also advantageous if the material used to form the mark 10 is heat resistant and chemically resistant. For this reason, marking materials that comprise inorganic pigments such as, for example, paints, enamels, laser marking compositions, inks, and transfer films, are particularly preferred.

A covering film 30 is applied to cover the mark 10 and, if desired, to cover an adjacent portion of the substrate 20. The covering film 30, which can but need not be bonded to the substrate, comprises a sufficient amount of at least one and more preferably a plurality of inorganic pigments such that the covering film 30 appears opaque in the visible portion of the electromagnetic spectrum (i.e., radiation having a wavelength within the range of from about 0.4 μm to about 0.75 μm), but is sufficiently transmissive at one or more wavelengths in the near infrared to mid infrared portion of the electromagnetic spectrum such that the radiation 40 can pass through the covering film 30 and strike the underlying mark 10 and the adjacent substrate 20 at such wavelength(s). Either the mark 10, the substrate 20, or both the mark 10 and the substrate 20, must reflect a detectable portion of the radiation 40 back through the covering film 30. The amount of reflected radiation "A" reflected by the mark 10, if any, must be sufficiently greater than or less than the amount of radiation "B" reflected by the substrate 20, if any, at a particular wavelength such that the mark 10 can be discerned or contrasted from the substrate 20 at such wavelength using an infrared imaging device.

The covering film 30 can be formed using any material that comprises adequate loadings of inorganic pigments such that the covering film 30 appears opaque in the visible portion of the electromagnetic spectrum but is sufficiently transmissive in the one or more regions of the infrared portion of the electromagnetic spectrum such that the mark can be discerned. Examples of covering films 30 that can be bonded to the article to cover the mark include paint films, porcelain emamel coatings, glass enamel coatings, inks and extruded or laminated plastic films. Examples of covering films 30 that need not be bonded to the article to cover the mark include glass panels and plastic films (e.g., shrink-wrap films). Thus, the covering film 30 can be formed using any conventional coating or covering technique such as, for example, painting, screen printing, ink jet printing, roll coating, spray coating, electrocoating, powder coating, stamping, labeling, shrink wrapping or marking with pens. The material used to form the covering film 30 preferably does not contain any components that prohibit the transmission of infrared radiation at the wavelength(s) in the near infrared to mid infrared portion of the electromagnetic spectrum that are to be used to detect the underlying mark. The preferred detection wavelengths are within the near infrared to mid infrared portion of the electromagnetic spectrum, which includes wavelengths within the range of from about 0.75 μm to about 40 μm. Ideally, the covering film 30 will be completely transparent at the detection wavelength(s).

Figure 2:
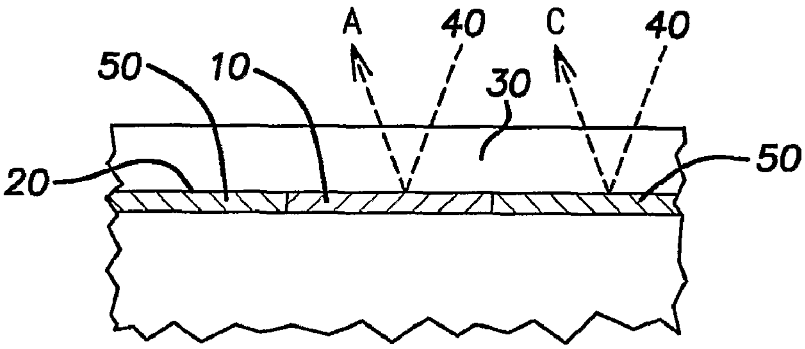
FIG. 2 is a schematic side sectional representation of a second embodiment of a non-visible mark formed on an article according to the invention.

FIG. 2 shows a schematic side sectional representation of a second embodiment of a non-visible mark formed on an article according to the invention. Because the second embodiment of the invention is similar to the first embodiment in many respects, the same reference numbers as used in FIG. 1 are used to identify similar structures in FIG. 2.

In the second embodiment, a mark 10 is formed on a substrate 20 using any conventional marking means. As in the first method, the substrate 20 can be a surface of an article or it can be a surface of a base or primer coating applied to an article. A contrast mark 50 is also formed on the substrate 20 adjacent to the mark 10. The contrast mark 50 can be formed before or after the mark 10, or simultaneously with the mark 10. The mark 10 and contrast mark 50 can be formed using any marking means including, but not limited to, painting, screen printing, ink jet printing, rolling, laser marking, powder coating, stamping and marking with pens. The composition of the materials used to form the mark 10 and contrast mark 50 is also not per se critical, but the mark 10 must either reflect or absorb radiation 40 emitted at one or more wavelengths within the near infrared to mid infrared portion of the electromagnetic spectrum at a level that is sufficiently different than that of the contrast mark 50 such that the mark 10 can be discerned from the contrast mark 50 at such wavelength(s). It is also advantageous if the materials used to form the mark 10 and contrast mark 50 are heat resistant and chemically resistant. For this reason, marking materials that comprise inorganic pigments such as, for example, paints, enamels, laser marking compositions, inks, and transfer films, are particularly preferred.

A covering film 30 is applied over the mark 10 and, if desired, over the contrast mark 50. The covering film 30 comprises a sufficient amount of at least one and more preferably a plurality of inorganic pigments such that the covering film 30 appears opaque in the visible portion of the electromagnetic spectrum, but is sufficiently transmissive at one or more wavelengths in the near infrared to mid infrared portion of the electromagnetic spectrum such that the radiation 40 can pass through the covering film 30 and strike the underlying mark 10 and the contrast mark 50 at such wavelength(s). Either the mark 10, the contrast mark 50, or both the mark 10 and the contrast mark 50, must reflect a detectable portion of the radiation 40 back through the covering film 30. The amount of reflected radiation "A" reflected by the mark 10, if any, must be sufficiently greater than or less than the amount of radiation "C" reflected by the contrast mark 50, if any, at a particular wavelength such that the mark 10 can be discerned or contrasted from the contrast mark 50 at such wavelength using an infrared imaging device.

Figure 3:
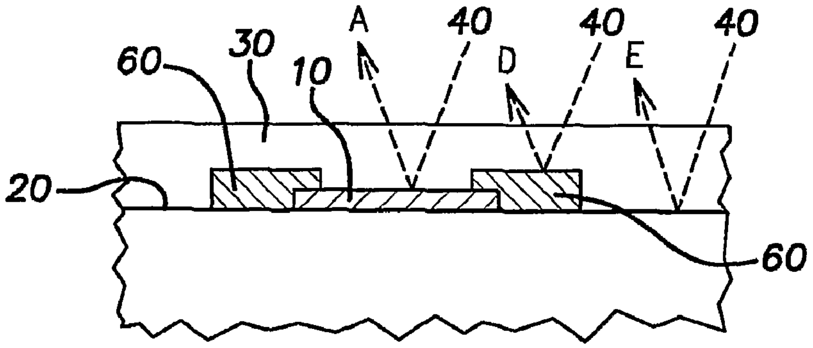
FIG. 3 is a schematic side sectional representation of a third embodiment of a non-visible mark formed on an article according to the invention.

FIG. 3 shows a schematic side sectional representation of a third embodiment of a non-visible anti-counterfeiting mark formed on an article according to the invention. Because the third embodiment of the invention is similar to the first and second embodiments in many respects, the same reference numbers as used in FIGS. 1 and 2 are used to identify similar structures in FIG. 3.

In the third embodiment, a mark 10 is formed on a substrate 20 using any conventional marking means. As in the first and second methods, the substrate 20 can be a surface of an article or it can be a surface of a base coating applied to an article. A mask 60 is formed to cover a portion of the mark 10 and, if desired, a portion of the substrate 20 adjacent to the mark 10. The mark 10 and mask 60 can be formed using any marking means including, but not limited to, painting, screen printing, ink jet printing, rolling, laser marking, powder coating, stamping and marking with pens. The composition of the material used to form the mark 10 and mask 60 is also not per se critical, but the mark 10 must either reflect or absorb radiation 40 emitted at one or more wavelengths within the near infrared to mid infrared portion of the electromagnetic spectrum at a level that is sufficiently different than that of the mask 60 such that the mark 10 can be discerned from the mask 60 at such wavelength(s). It is also advantageous if the materials used to form the mark 10 and mask 60 are heat resistant and chemically resistant. For this reason, marking materials comprising inorganic pigments such as, for example, paints, enamels, laser marking powders, inks, and transfer films, are particularly preferred.

A covering film 30 is then applied over the mark 10 and, if desired, over the mask 60. The covering film 30 comprises a sufficient amount of at least one and more preferably a plurality of inorganic pigments such that the covering film 30 appears opaque in the visible portion of the electromagnetic spectrum, but is sufficiently transmissive at one or more wavelengths in the near infrared to mid infrared portion of the electromagnetic spectrum such that the radiation 40 can pass through the covering film 30 and strike the underlying mark 10 and the mask 60 at such wavelength(s). Either the mark 10 or the mask 60, or both the mark 10 and the mask 60, must reflect a detectable portion of the radiation 40 back through the covering film 30. The amount of reflected radiation "A" reflected by the mark 10, if any, must be sufficiently greater than or less than the amount of radiation "D" reflected by the mask 60, if any, at a particular wavelength such that the mark 10 can be discerned or contrasted from the mask 60 at such wavelength using an infrared imaging device.

It will be appreciated that combinations of the aforementioned embodiments can also be used. For example, a mask 60, such as is shown in FIG. 3, could be applied to and used to selectively cover portions of the mark 10 and/or the contrast mark 50 shown in FIG. 2. Alternatively, the mark 10 and/or mask 60 shown in FIG. 3 could be contrasted from the substrate 20 if the amount of radiation "E" reflected by the substrate 20, if any, at a particular wavelength was sufficiently different from the amount of radiation "A" reflected by the mark 10 and/or the amount of radiation "D" reflected by the mask 60. Furthermore, it is possible to incorporate the marking, contrast marking and/or masking materials in the article itself (e.g., by molding or compounding), as opposed to such materials being applied as coating layers, to from a non-visible anti-counterfeiting mark on an article according to the invention. Furthermore, intermediate layers that are transmissible of infrared radiation at the detection wavelength(s) can be applied or situated between the mark and the covering film. And, outer or top layers that are transmissible of infrared radiation at the detection wavelength(s) can be applied over the covering film if desired, such as for decoration or protection.

The inorganic pigments used to form the covering film 30 preferably have a particle size of from about 0.02 μm to about 15 μm. A particle size of from about 0.2 μm to about 15 μm is optimal for scattering radiation in the visible portion of the electromagnetic spectrum, which provides excellent opacity and hiding performance. A particle size of from about 0.02 μm to about 0.3 μm is optimal for the transmission of radiation in the near infrared to mid infrared portion of the electromagnetic spectrum. Selection of the particle size of the inorganic pigment(s) in the covering film must be made in view of the particular application, with larger particle size pigments being used in applications where greater hiding power or opacity is necessary, and smaller particle size pigments being used in applications where greater infrared transmission is necessary.

The loading of inorganic pigments in the covering film 30 is not per se critical. However, the loading must be sufficient to make the cover coat appear sufficiently opaque in the visible portion of the electromagnetic spectrum to hide the underlying mark or marks (i.e., the mark, contrast mark and/or mask), but not so great that transmission of radiation in the near infrared to mid infrared portion of the electromagnetic spectrum through the covering film 30 is blocked. The thickness of the covering film can also affect the transmission of infrared radiation, with thicker films tending to absorb greater amounts of infrared radiation than thinner films.

Infrared reflective inorganic pigments are particularly suitable for use in forming the mark beneath the cover coat. Pigments comprised of Fe—Cr, Fe—Cr—Mn, Fe—Cr—Al, Sr—Mn, Ba—Mn, Ca—Mn, Y—Mn, V—Mn, Bi—Mn, Cr—Al oxides, commonly referred to as mixed metal oxides or complex inorganic colored pigments may be used. Specific examples of infrared reflective inorganic pigments include: manganese vanadium oxide pigments (hereinafter referred to as "$Mn_2V_2O_7$"), which are disclosed in Swiler, U.S. Pat. No. 6,485,557; rare earth manganese oxide pigments according to the formula $M_xMnO_y$, where M is yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality, which are disclosed in Swiler et al., U.S. Pat. No. 6,541,112; bismuth manganese oxide pigments (hereinafter referred to as "$Bi_2Mn_4O_{10}$"), which are disclosed in Sakoske et al., U.S. Pat. No. 6,221,147; alkaline earth manganese oxide pigments according to the formula $M_xMnO_y$, where M is calcium, strontium, barium and/or magnesium, x is a number from about 0.01 to about 99, and y is greater than or equal to X+1 and less than or equal to X+2 and designates the number of oxygen atoms required to maintain electroneutrality, which are disclosed in Sullivan et al., U.S. Pat. No. 6,416,868; and solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc, and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc, which are disclosed in Sliwinski et al., U.S. Pat. No. 6,174,360, all of which are hereby incorporated by reference in their entirety. In addition, inorganic pigments comprising of Cd, Sb, Se sulfides or oxysulfides may be used to obtain the desired and unique spectral curve outside of the visible portion of the electromagnetic spectrum.

Pigments referred to as IR reflecting in the previous paragraph were developed primarily due to their ability to not absorb solar radiation in the infrared portion of the electromagnetic spectrum. The use of these pigments is primarily in objects that are desired to be optically dark, yet remain cooler when exposed to radiation with a significant amount of infrared energy. In addition, these pigments can be used to differentiate objects that look the same by providing differences in IR reflectance from these objects or marks. With IR sensing equipment, the IR signal obtained from these IR reflective pigments either painted on or part of the object, film or fiber can be used to provide differentiation, authenticity, or display information that is invisible to the naked eye.

Carbon black can also be used as a marking material on infrared reflective substrates. Carbon black absorbs infrared radiation, which makes it contrastable from infrared reflective materials.

As noted, the covering film must comprise at least one inorganic pigment at a sufficient loading so as to exhibit enough opacity to conceal the underlying mark or marks, yet be sufficiently transmissive of infrared radiation at one or detection wavelengths such that the mark can be discerned through the covering film. Applicants have discovered that a variety of inorganic pigments can be used to form covering coats. Table 1 below sets forth a non-exhaustive exemplary list of preferred inorganic pigment families that can be used to form covering films and representative ranges of wavelengths within the infrared portion of the electromagnetic spectrum where such pigment families are particularly transmissive:

TABLE 1

| Pigment Family | IR Transmissive Wavelengths |
|---|---|
| C.I. Pigment Black 12 | 1140-2500 nm |
| C.I. Pigment Black 27 | 1860-2130 nm |
| C.I. Pigment Black 30 | 1600-2350 nm |
| C.I. Pigment Blue 36 | 720-1140, 1710-2500 nm |
| C.I. Pigment Brown 24 | 790-2500 nm |
| C.I. Pigment Brown 33 | 1110-2500 nm |
| C.I. Pigment Green 17 | 760-2240 nm |
| C.I. Pigment Green 26 | 750-1150, 1760-2260 nm |
| C.I. Pigment Green 50 | 850-1050, 1880-2430 nm |
| C.I. Pigment Yellow 119 | 850-2500 nm |
| C.I. Pigment Yellow 164 | 1080-2500 nm |
| $Bi_2Mn_4O_{10}$ | 1600-1950 nm |
| $SrMnO_3$ | 1000-2250 nm |
| $YMnO_3$ | 1020-2500 nm |

It will be appreciated that a wide variety of colors are possible within a C.I. Pigment family, depending upon the relative amounts of the individual elemental constituents in the pigment and the presence or absence of various dopant elements. These relative differences create variations in the reflectance curves for individual inorganic pigments in the visible region of the electromagnetic spectrum and in the infrared portion of the electromagnetic spectrum. Selection of an inorganic pigment or combination of inorganic pigments, therefore, must be made in view of the desired appearance of the cover coating in the visible portion of the electromagnetic spectrum and the transmissivity of the inorganic pigment(s) at the detection wavelength(s) in the infrared portion of the electromagnetic spectrum.

It will also be appreciated that inorganic pigments that are partially transparent in the visible and in the infrared that can also be used to form a cover coating according to the invention. Such partially transparent inorganic pigments can be blended with pigments that are sufficiently opaque in the visible portion of the electromagnetic spectrum to conceal the underlying mark from view in the visible portion of the spectrum. An example of such a combination is C.I. Pigment Blue 28, which is transmissive in the range of 700 to 1100 nm, and C.I. Pigment Yellow 53, which is transmissive in the range of 760 to 2400 nm.

Infrared detectors can be used to detect the differences in infrared reflectance levels (between the mark, contrast mark, substrate and/or mask) through the covering film at one or more predetermined wavelengths within the range of from about 0.75 μm to about 40 μm. Detection wavelengths between 0.830 μm and 0.940 μm are particularly preferred. Conventional charge coupled devices (CCD's) can be used as infrared detectors in accordance with the invention. Typically such devices include one or more infrared radiation emitters. Excessive amounts of infrared radiation can create a glare that makes observation of the mark beneath the covering film difficult. Accordingly, a diffuser is preferable used.

In addition to detecting bar codes, logos and other authentication marks that are not visible in the visible portion of the electromagnetic spectrum, infrared detectors can be used to measure the relative intensities at one or more predetermined wavelengths to detect counterfeit articles. The effect is particularly useful when the cover coating appears dark to a human observer in the visible portion of the spectrum, but includes a highly reflective mark that can be readily discerned using an infrared detector. Suitable infrared radiation generating sources include natural light, light emitting diodes, incandescent lights, lasers and/or fluorescent lights. Measurement of the spectral curve may be done with a spectrophotometer or any light to signal converter such as doped silicon chips, photo multiplier chips, or electric eyes.

The following examples are intended only to illustrate the invention and should not be construed as imposing limitations upon the claims. All raw materials referenced in the examples are standard pigment grade powders unless otherwise indicated.

EXAMPLE 1

34.5 grams of aluminum hydroxide, 35.2 grams of cobalt oxide and 28.4 grams of chromium oxide were thoroughly mixed together in a Waring blender and calcined in a mullite crucible at 1300° C. for 4 hours. The resulting blue inorganic pigment was milled using a zirconia media bead mill to an average particle size ($D_{50}$) of 0.7 μm.

EXAMPLE 2

A blue paint composition was formed by mixing 12.3 g of the inorganic pigment from Example 1 into 39.3 g of an alkyd melamine paint base (consisting of 51.02% by weight setal setamine 84XX, 28.52% by weight xylene, 20% by weight setamine and 0.46% by weight SC-100). The blue paint composition was drawn down on a Leneta 2A opacity chart, which is commercially available from Byk-Gardner, at a thickness of approximately 5 mils and permitted to air dry. The top portion of the opacity chart appears black and the bottom portion of the opacity chart appears white in the visible portion of the electromagnetic spectrum.

Figure 4:
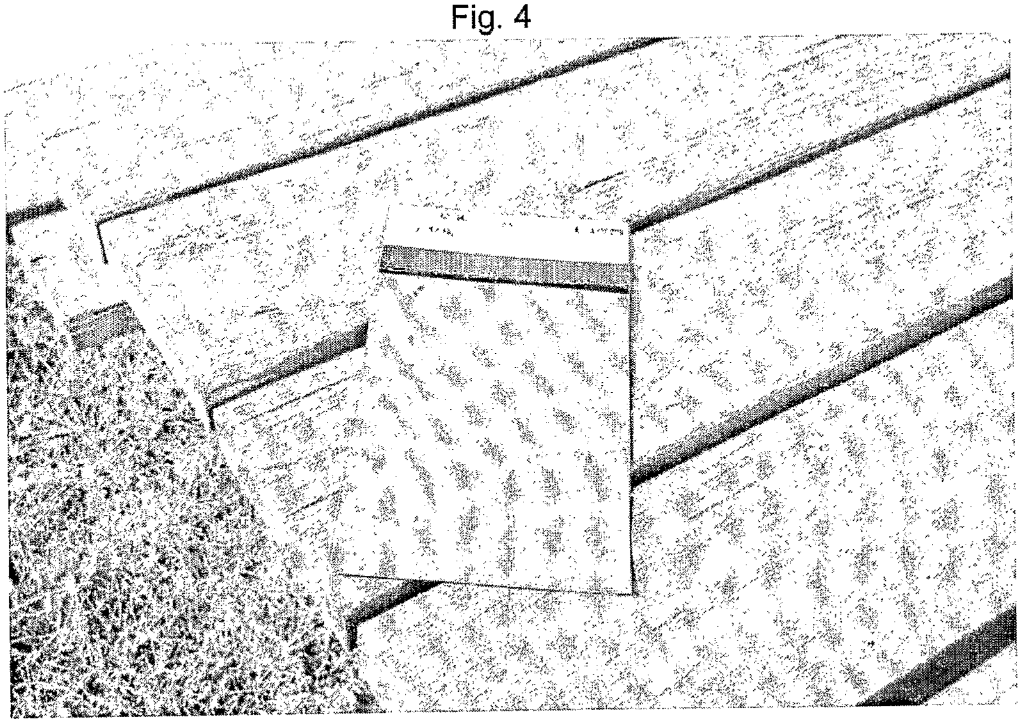
FIG. 4 is a photograph showing an opacity chart covered with a blue opaque paint film as viewed in the visible portion of the electromagnetic spectrum.

FIG. 4 is a photograph of the painted test chart taken with an Olympus C-8080WZ digital camera using automatic aperture priority exposure. FIG. 4 shows that the blue paint covering film applied to the opacity chart appears opaque in the visible portion of the electromagnetic spectrum. The underlying black and white portions cannot be seen or differentiated through the blue paint film.

Figure 5:
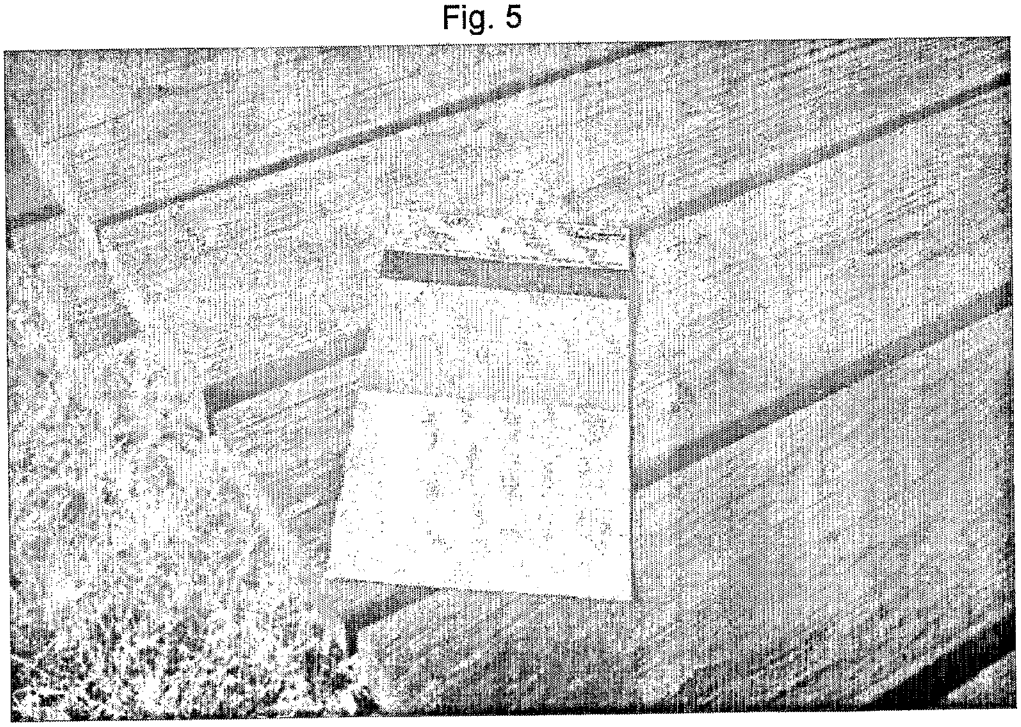
FIG. 5 is a photograph of the opacity chart shown in FIG. 4 as viewed in the near infrared portion of the electromagnetic spectrum.

FIG. 5 is a photograph of the same painted opacity chart shown in FIG. 4 taken with the same camera using a Hoya RM72 Infrared filter. FIG. 5 shows that the black portion of the opacity chart can easily be contrasted from the white portion of the opacity chart beneath the blue covering film.

EXAMPLE 3

Twenty-one polyvinylidene fluoride masstone paint compositions were separately formed by blending 13.5% by weight of one of the pigments listed in Table 2 below with 40.8% by weight isophorone, 22.1% by weight KYNAR-500, and 23.6% by weight PARALOID B-44S. The well mixed paint was applied to aluminum panels using a #60 bar without additional thinning of the samples followed by air drying to obtain a dried film 0.9 mils thick having a pigment loading of 30% by weight. The difference in infrared reflectance of the paint film measured between 0.940 μm and 0.830 μm is reported in Table 2 below:

TABLE 2

| Sample Number | Pigment Family | Formula | % Reflectance |
|---|---|---|---|
| 1 | IR-Black | $YMnO_3$ | 43.60 |
| 2 | Brown | Y—Mn—O | 40.20 |
| 3 | IR-Brown | $BaMnO_3$ | 26.39 |
| 4 | IR-Black | $SrMnO_3$ | 26.24 |
| 5 | Brown 33 | $(Zn,Fe)(Fe,Cr)_2O_4$ | 21.43 |
| 6 | Blue 29 | Ultramarine | 16.11 |
| 7 | IR-Brown | $V_2Mn_2O_7$ | 15.70 |
| 8 | Yellow 119 | $(Zn,Fe)Fe_2O_4$ | 15.24 |
| 9 | Violet 48 | Cobalt Magnesium | 15.13 |
| 10 | Yellow 119 | $(Zn,Fe)Fe_2O_4$ | 14.53 |
| 11 | Yellow 119 | $(Zn,Fe)Fe_2O_4$ | 14.09 |
| 12 | Yellow 164 | $(Ti,Sb,Mn)O_2$ | 14.08 |
| 13 | Black 27 | Iron Cobalt Chromite | 13.88 |
| 14 | Yellow 119 | $(Zn,Fe)Fe_2O_4$ | 13.75 |
| 15 | IR-Green | $Y_2Cu_2O_5$ | 13.43 |
| 16 | Yellow 164 | $(Ti,Sb,Mn)O_2$ | 13.13 |
| 17 | Yellow 164 | $(Ti,Sb,Mn)O_2$ | 12.45 |
| 18 | Yellow 164 | $(Ti,Sb,Mn)O_2$ | 12.40 |
| 19 | IR-Brown | $CaMn_2O_4$ | 12.39 |
| 20 | Yellow 164 | $(Ti,Sb,Mn)O_2$ | 12.38 |
| 21 | IR-Black | $Bi_2Mn_4O_{10}$ | 11.96 |

EXAMPLE 4

An air-dry waterborne acrylic spray cover coating was prepared by mixing the components identified in Table 3 below:

TABLE 3

| Component | Supplier | Weight Percent |
|---|---|---|
| Rhoplex HG95 | Rohm and Haas, Philadelphia, PA | 40.1 |
| Disperbyk 192 | Byk Chemie, Wallingford, CT | 1.2 |
| IR-Black (Sample 1) | Ferro Corp., Washington, PA | 5.1 |
| Acrysol I62 | Rohm and Haas, Philadelphia, PA | 6.0 |

TABLE 3-continued

| Component | Supplier | Weight Percent |
|---|---|---|
| Joncryl 60 | Johnson Polymer, Sturtevant, WI | 16.8 |
| Amietol M21 | Brenntag, Reading, PA | 0.9 |
| Butyl Cellosolve | Chemcentral, Pittsburgh, PA | 2.8 |
| A-1100 silane | G.E. Silicones/Silquest, S. Charleston, WV | 1.0 |
| Distilled Water | — | 5.0 |
| Dee Fo XRM 1547A | Ultra Additives, Patterson, NJ | 0.6 |
| Disparlon AQ200 | King Industries, Norwalk, CT | 0.6 |

A 4" by 12" steel test panel, available from Q-Panel Lab Products, Cleveland, Ohio, was laser marked with black markings using CerMark LMM-6000 laser marking material available from Ferro Corporation and a Universal 35 Watt $CO_2$ laser marking system. Three lines of text were marked on the panel as well as three Data MATRIX™ 2D bar codes and one UPC code. The panel was then sprayed using a Binks model MlG HVLP spray gun with the above coating. Two coats were applied and allowed to air dry. The dried film thickness of the paint was about 1.3 to 1.7 mils. When viewing the panel using a Sony Handicam Model DCR-TRV730 in normal mode, the black laser markings were not visible to the human eye under any lighting conditions after painting. The Sony Handycam was switched to Nightshot mode, which allows the CCD in the camera to captures image in the near infrared to mid infrared portion of the electromagnetic spectrum. When using the camera in Nightshot mode, all of the black laser markings concealed beneath the paint film could be readily observed in the infrared portion of the spectrum. All of the text could be read easily, and the bar codes were of sufficient contrast that, given the appropriate software, they could have been decoded.

EXAMPLE 5

A polyurethane spray cover coating was prepared by mixing the components identified in Table 4 below:

TABLE 4

| Component | Supplier | Weight Percent |
|---|---|---|
| Joncryl 910 | Johnson Polymer, Sturtevant, WI | 40.1 |
| Byk 322 | Byk Chemie, Wallingford, CT | 0.7 |
| EEP Solvent | Chemcentral, Pittsburgh, PA | 11.2 |
| PMA Solvent | Chemcentral, Pittsburgh, PA | 13.5 |
| IR-Black (Sample 1) | Ferro Corp., Washington, PA | 14.4 |
| MEK | Chemcentral, Pittsburgh, PA | 0.3 |
| Metacure T12 | Air Products, Allentown, PA | 0.001 |
| Desmodur Z4470 BA | Bayer Corp., Pittsburgh, PA | 20.1 |

Figure 6:
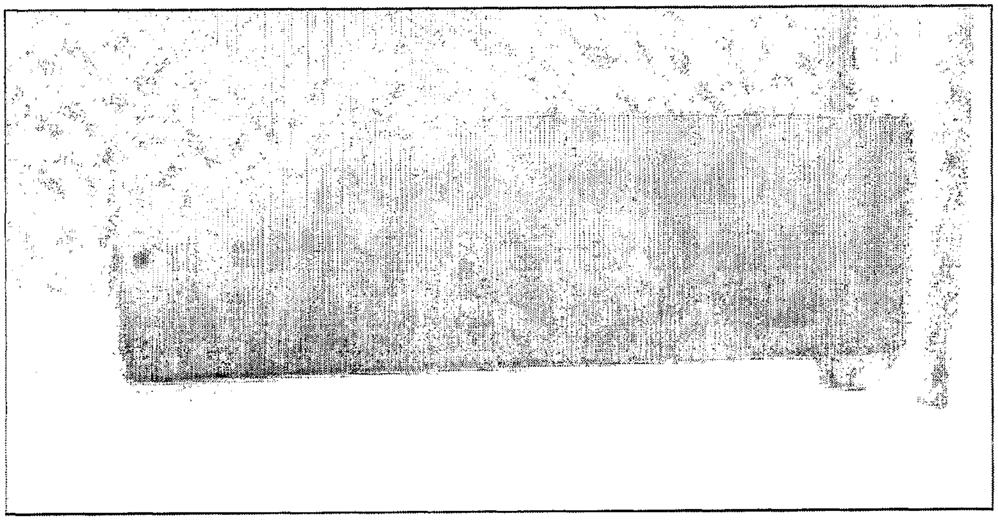
FIG. 6 is an image capture of a test panel having a contrastable mark and covering film applied thereto as viewed with an infrared security camera with an IR cutoff filter placed in front of the lens.
Figure 7:
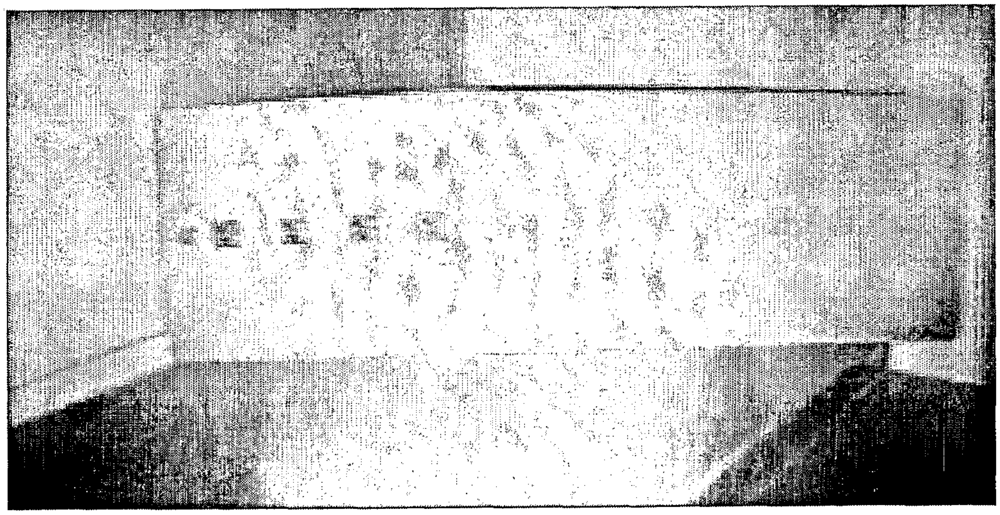
FIG. 7 is an image capture of the test panel shown in FIG. 6 as viewed with the infrared security camera without the IR cutoff filter.

A 4" by 12" aluminum test panel, available from Q-Panel Lab Products, Cleveland, Ohio, was laser marked with black markings using CerMark LMM-6000 laser marking material available from Ferro Corporation and a Universal 35 Watt $CO_2$ laser marking system. Eleven Data MATRIX™ 2D bar codes spaced equally were marked down the center of the panel. The panel was then sprayed using a Binks model MlG HVLP spray gun with the above coating composition in two coating applications. The polyurethane coating was feathered across the length of the panel to provide a paint film that gradually increased in thickness from 0 mils on one end to 1.3-1.7 mils on the other. A total of two coats were applied and allowed to air dry. The black laser markings that were covered with the polyurethane film were not visible to the unaided human eye under any lighting conditions after painting. A camera from a G.E. Wired Security Surveillance System, model GESECCTVCB60, available from Circuit City stores, was used to view the panel. An IR cutoff filter, available from Edmund Optics, Blackwood N.J., was placed in front of the lens. This is analogous to what the human eye sees. FIG. 6 is a screen capture image showing that the underlying marks could not be seen through the polyurethane film. FIG. 7 is a screen capture image showing that the camera, with night vision capability, was able to clearly distinguish all of the bar codes under the paint once the IR cutoff filter was removed from the lens. The bar codes could be read and decoded off of a 5.5" monitor provided with the system with an RVSI model HT-150 hand held image reader, available from RVSI, Canton Mass.

EXAMPLE 6

0.75% by weight of IR Transparent Pigment from Ferro Corporation of Washington, Pa. was blended into 99.25% by weight of polystyrene resin. The pigmented polystyrene was injection molded to form a 2" by 2" test chip using a Battenfeld Plus 250 Injection molder, available from Battenfeld, Austria. The chip was placed over a piece of paper with black text printed on it in such a manner that the black text was partially covered by the plastic chip. None of the text concealed under the chip was visible to the unaided human eye under any lighting conditions. However, the text was visible through the plastic chip using the G.E. Security camera described in Example 5.

EXAMPLE 7

An automotive engine bearing, available from Federal Mogul, Southfield Mich., as Part No. 2555 was laser marked with black markings using CerMark LMM-6000 laser marking material available from Ferro Corporation and a Universal 35 Watt $CO_2$ laser marking system. The bearing was marked with a Data MATRIX" 2D bar code, a line of text and numbers and a graphic logo. The part was then sprayed using a Binks model MIG HVLP spray gun with the polyurethane spray cover coating from Example 5. Two coats were applied and allowed to air dry. The dried film thickness of the paint was about 1.3 to 1.7 mils. None of the applied laser markings was visible to the unaided human eye under any lighting conditions after painting. The surveillance system camera from Example 5 was then used to view the panel. This camera, with night vision capability, was able to clearly distinguish the markings under the paint.

Figure 8:
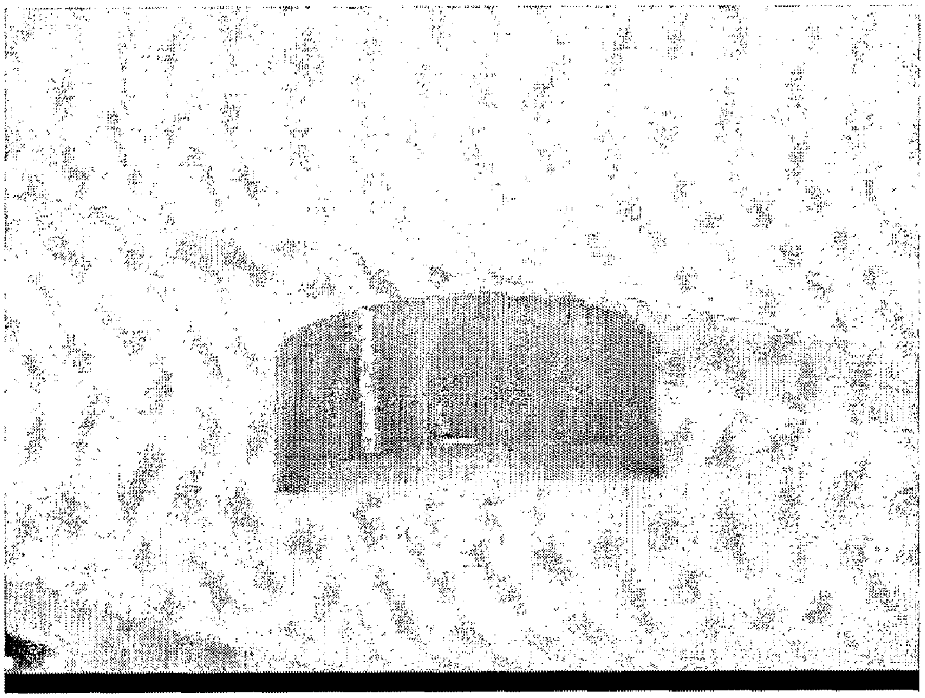
FIG. 8 is an image capture of an automotive bearing having a contrastable mark and covering film applied thereto as viewed with an infrared security camera with an IR cutoff filter placed in front of the lens.
Figure 9:
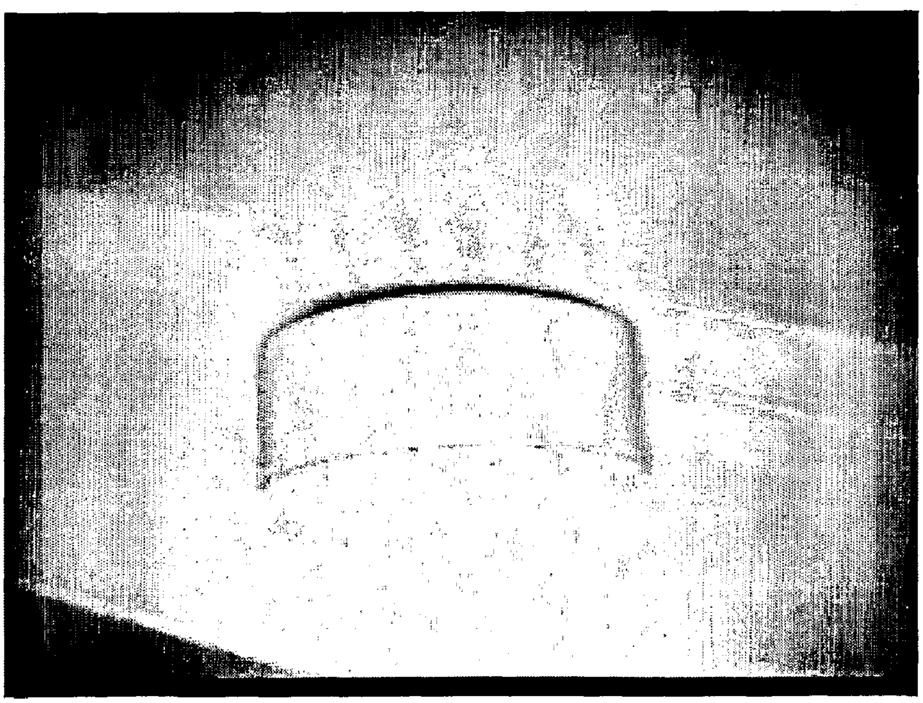
FIG. 9 is an image capture of the automotive bearing shown in FIG. 8 as viewed with the infrared security camera without the IR cutoff filter.

FIG. 8 is an image capture of the bearing as viewed with the camera with an IR cutoff filter, available from Edmund Optics, Blackwood N.J., placed in front of the lens. This is analogous to what the human eye sees. The underlying marks cannot be seen. FIG. 9 is an image capture of the bearing as viewed with the camera without the IR filter in place. The text and numerals are now clearly visible through the paint, as the camera is now detecting the IR wavelengths.

EXAMPLE 8

An automotive PCV valve, available from Fram, Danbury, Conn., as Part No. PV-140 was laser marked with black markings using CerMark LMM-6000 laser marking material available from Ferro Corporation and a Universal 35 Watt $CO_2$ laser marking system. The valve was marked with a part number and a text string. The part was then sprayed using a Binks model MIG HVLP spray gun with the polyurethane spray cover coating from Example 5. Two coats were applied and allowed to air dry. The dried film thickness of the paint was about 1.3 to 1.7 mils. None of the markings were visible to the eye under any lighting conditions after painting. The surveillance system camera was used to view the panel. This camera, with night vision capability, was able to clearly distinguish the markings under the paint.

Figure 10:
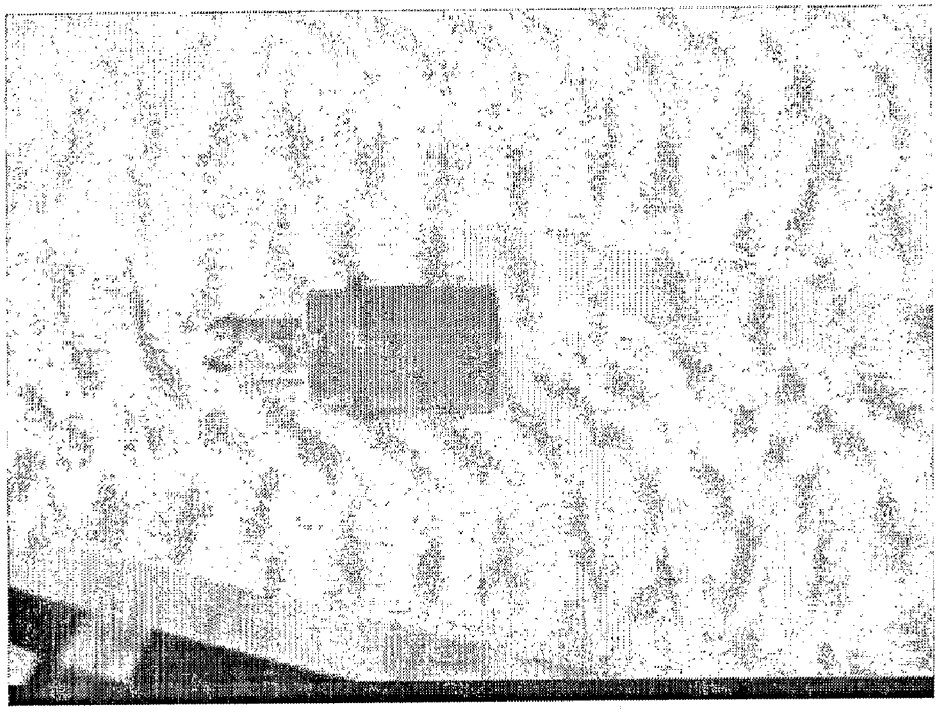
FIG. 10 is an image capture of an automotive PCV valve having a contrastable mark and covering film applied thereto as viewed with an infrared security camera with an IR cutoff filter placed in front of the lens.
Figure 11:
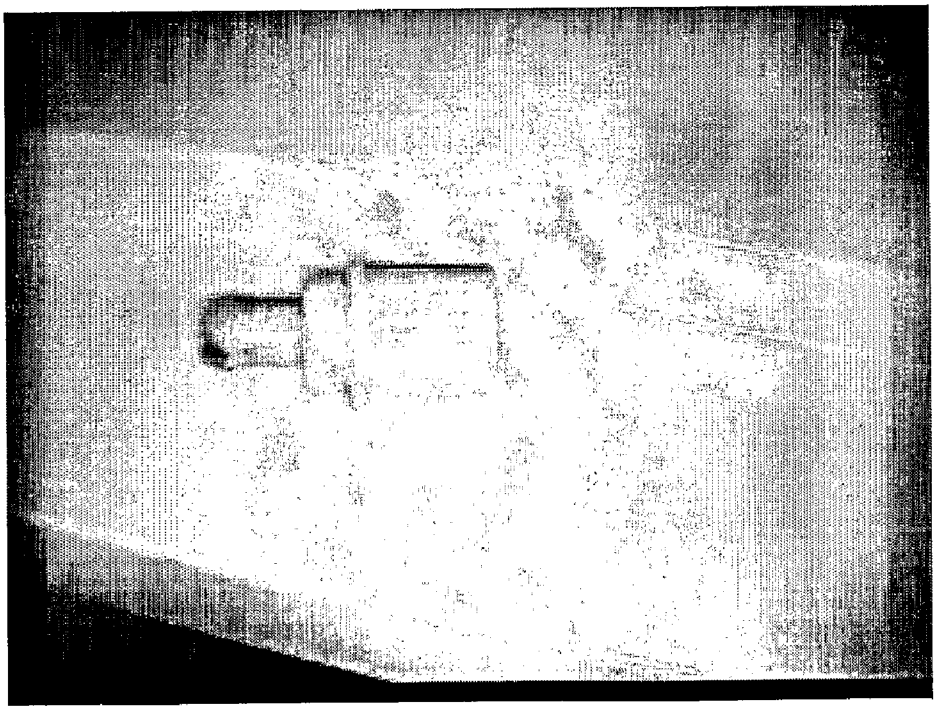
FIG. 11 is an image capture of the automotive PCV valve shown in FIG. 10 as viewed with the infrared security camera without the IR cutoff filter.

FIG. 10 is an image capture of the valve as viewed with the camera with an IR cutoff filter, available from Edmund Optics, Blackwood N.J., placed in front of the lens. This is analogous to what the human eye sees. The underlying marks cannot be seen. FIG. 11 is an image capture of the valve as viewed with the camera without the IR filter in place. The text and part number are now clearly visible through the paint, as the camera is now detecting the IR wavelengths.

EXAMPLE 9

Figure 12:
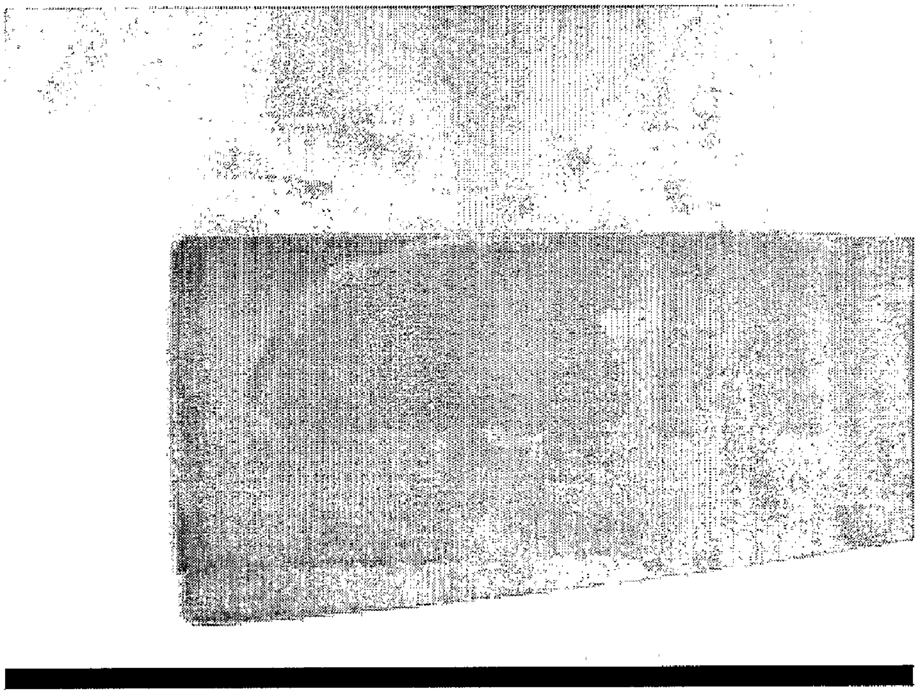
FIG. 12 is an image capture of a test panel having a contrastable mark and covering film applied thereto as viewed with an infrared security camera with an IR cutoff filter placed in front of the lens.
Figure 13:
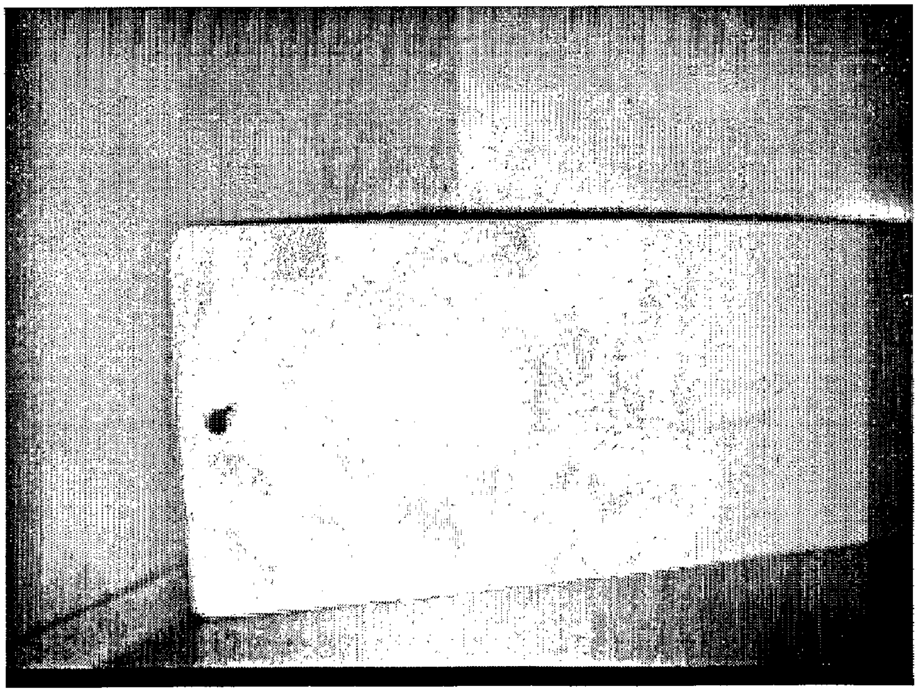
FIG. 13 is an image capture of the test panel shown in FIG. 12 as viewed with the infrared security camera without the IR cutoff filter.

A 4" by 12" aluminum test panel, available from Q-Panel Lab Products, Cleveland Ohio, was marked with a black SHARPIE brand permanent marker with letters. The panel was then sprayed with the covering coating from example 5 using a Binks model MIG HVLP spray gun. The polyurethane coating was applied to the panel to provide a paint film that had a dry film thickness of 1.3-1.7 mils. The marks formed with the SHARPIE brand permanent marker were not visible to the human eye through the covering film under any lighting conditions, but the markings were readily observable in the display of the infrared surveillance system camera. FIG. 12 is an image capture of the test panel as viewed with the camera with an IR cutoff filter, available from Edmund Optics, Blackwood N.J., placed in front of the lens. This is analogous to what the human eye sees. The underlying marks cannot be seen. FIG. 13 is an image capture of the test panel as viewed with the camera without the IR filter in place. The handwritten text is now clearly visible through the covering film, as the camera is now detecting the IR wavelengths.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention claimed is:

1. A method of forming an infrared detectable mark on a substrate comprising:

forming the mark on the substrate using a laser marking system and a laser marking composition comprising an infrared reflective inorganic pigment, wherein the infrared reflective inorganic pigment causes the mark to reflect radiation at a predetermined wavelength within the range of 0.75 μm to 40 μm at a sufficiently different level than the substrate adjacent to the mark such that the mark can be discerned from the substrate at the predetermined wavelength; and applying a cover coating material comprising an inorganic pigment that is different than the infrared reflective inorganic pigment in the laser marking composition over the mark and over at least a portion of the substrate adjacent to the mark to form a cover coat, wherein the cover coat is in the form of a film selected from the group consisting of paint films, porcelain enamel coating films, glass enamel coating films, extruded plastic films and laminated plastic films, wherein the cover coat appears substantially opaque in the visible portion of the electromagnetic spectrum such that it conceals the mark covered by the cover coat in the visible portion of the electromagnetic spectrum but is sufficiently transmissive of radiation emitted at the predetermined wavelength such that the mark can be discerned from the substrate through the cover coat at the predetermined wavelength.

2. The method according to claim 1 wherein the substrate is a surface of a part for installation in a land vehicle or aircraft.

3. The method according to claim 1 wherein the substrate is a primer coat layer applied to a surface of an article.

4. The method according to claim 1 wherein the infrared reflective inorganic pigment is one or more selected from the group consisting of:

$Mn_2V_2O_7$;

$M1_xMnO_y$, where M1 is calcium, strontium, barium, magnesium, yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality;

$Bi_2Mn_4O_{10}$;

solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc; and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc.

5. The method according to claim 1 wherein the average particle size of the inorganic pigment in the cover coating material is from about 0.02 μm to about 15 μm.

6. The method according to claim 1 wherein the average particle size of the inorganic pigment in the cover coating material is from about 0.1 μm to about 0.5 μm.

7. The method according to claim 1 wherein the mark is in the form of a machine-readable code.

8. The method according to claim 1 wherein the inorganic pigment in the cover coating material is doped with one or more elements such that the inorganic pigment provides a uniquely identifiable spectral curve.

9. The method according to claim 1 wherein the cover coating material comprises two or more different inorganic pigments that together provide a uniquely identifiable spectral curve.

10. A method of forming an infrared detectable mark on a substrate comprising:

applying a marking material comprising an infrared reflective inorganic pigment to the substrate to form the mark;

applying a contrast marking material to the substrate to form a contrast mark proximal to the mark, wherein the infrared reflective inorganic pigment causes the mark to reflect radiation at a predetermined wavelength within the range of from about 0.75 μm to about 40 μm at a sufficiently different level than the contrast mark such that the mark can be discerned from the contrast mark at the predetermined wavelength, wherein at least one of the mark and the contrast mark is formed using a laser marking system; and applying a cover coating material comprising an inorganic pigment that is different than the infrared reflective inorganic pigment in the marking material over the mark and the contrast mark to form a cover coat, wherein the cover coat is in the form of a film selected from the group consisting of paint films, porcelain enamel coating films, glass enamel coating films, extruded plastic films and laminated plastic films, wherein the cover coat appears substantially opaque in the visible portion of the electromagnetic spectrum such that it conceals both the mark and the contrast mark covered by the cover coat in the visible portion of the electromagnetic spectrum but is sufficiently transmissive of radiation emitted at the predetermined wavelength such that the mark can be discerned from the contrast mark through the cover coat at the predetermined wavelength.

11. The method according to claim 10 wherein the substrate is a surface of an article.

12. The method according to claim 10 wherein the substrate is a base coat layer applied to a surface of an article.

13. The method according to claim 10 wherein the infrared reflective inorganic pigment is one or more selected from the group consisting of:

$Mn_2V_2O_7$;

$M1_xMnO_y$, where M1 is calcium, strontium, barium, magnesium, yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality;

$Bi_2Mn_4O_{10}$;

solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc; and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc.

14. The method according to claim 10 wherein the average particle size of the inorganic pigment in the cover coating material is from about 0.02 μm to about 15 μm.

15. The method according to claim 10 wherein the average particle size of the inorganic pigment in the cover coating material is from about 0.1 μm to about 0.5 μm.

16. The method according to claim 10 wherein the substrate is selected from the group consisting of metal, glass, wood, plastic and ceramic.

17. The method according to claim 10 wherein the mark is in the form of a bar code.

18. The method according to claim 10 wherein the inorganic pigment in the cover coating material is doped with one or more elements such that the inorganic pigment provides a uniquely identifiable spectral curve.

19. The method according to claim 10 wherein the cover coating material comprises two or more different inorganic pigments that together provide a uniquely identifiable spectral curve.

20. The method according to claim 10 wherein the contrast marking material comprises an infrared reflective inorganic pigment that is different from the infrared reflective organic pigment in the marketing material.

21. The method according to claim 20 wherein the infrared reflective inorganic pigment in the contrast marking material is one or more selected from the group consisting of:

$Mn_2V_2O_7$;

$M1_xMnO_y$, where M1 is calcium, strontium, barium, magnesium, yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality;

$Bi_2Mn_4O_{10}$;

solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc; and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc.

22. A method of forming an infrared detectable mark on a substrate comprising:

applying a marking material comprising an infrared reflective inorganic pigment to the substrate to form the mark;

applying a masking material over a least a portion of the mark and, optionally, over a portion of the substrate, to form a mask, wherein the infrared reflective inorganic pigment causes the mark to reflect radiation at a predetermined wavelength within the range of 0.75 μm to 40 μm at a sufficiently different level than the mask such that the mark can be discerned from the mask at the predetermined wavelength, wherein at least one of the mark and the mask is formed using a laser marking system; and applying a cover coating material comprising an inorganic pigment that is different than the infrared reflective inorganic pigment in the marking material over the mark and the mask to form a cover coat, wherein the cover coat is in the form of a film selected from the group consisting of paint films, porcelain enamel coating films, glass enamel coating films, extruded plastic films and laminated plastic films, wherein the cover coat appears substantially opaque in the visible portion of the electromagnetic spectrum such that it conceals both the mark and the mask covered by the cover coat in the visible portion of the electromagnetic spectrum but is sufficiently transmissive of radiation emitted at the predetermined wavelength such that the mark can be discerned from the mask through the cover coat at the predetermined wavelength.

23. The method according to claim 22 wherein the substrate is a surface of an article.

24. The method according to claim 22 wherein the substrate is a base coat layer applied to a surface of an article.

25. The method according to claim 22 wherein the infrared reflective inorganic pigment is one or more selected from the group consisting of:

$Mn_2V_2O_7$;

$M1_xMnO_y$, where M1 is calcium, strontium, barium, magnesium, yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality;

$Bi_2Mn_4O_{10}$;

solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc; and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc.

26. The method according to claim 22 wherein the average particle size of the inorganic pigment in the cover coating material is from about 0.02 μm to about 15 μm.

27. The method according to claim 22 wherein the average particle size of the inorganic pigment in the cover coating material is from about 0.1 μm to about 0.5 μm.

28. The method according to claim 22 wherein the substrate is selected from the group consisting of metal, glass, wood, plastic and ceramic.

29. The method according to claim 22 wherein the mark is in the form of a bar code.

30. The method according to claim 22 wherein the inorganic pigment in the cover coating material is doped with one or more elements such that the inorganic pigment provides a uniquely identifiable spectral curve.

31. The method according to claim 22 wherein the cover coating material comprises two or more different inorganic pigments that together provide a uniquely identifiable spectral curve.

32. The method according to claim 22 wherein the masking material comprises an infrared reflective inorganic pigment that is different than the infrared reflective inorganic pigment in the marking material.

33. The method according to claim 32 wherein the infrared reflective inorganic pigment in the masking material is one or more selected from the group consisting of:

$Mn_2V_2O_7$;

$M1_xMnO_y$, where M1 is calcium, strontium, barium, magnesium, yttrium and/or an element selected from the Lanthanide series of the Periodic Table of the Elements, x is a number from about 0.01 to about 99, and y is greater than or equal to X+1 and less than or equal to X+2 and designates the number of oxygen atoms required to maintain electroneutrality;

$Bi_2Mn_4O_{10}$;

solid solutions having a corundum-hematite crystalline structure comprising iron oxide a host component doped with guest elements selected from aluminum, antimony, bismuth, boron, chrome, cobalt, gallium, indium, lanthanum, lithium, magnesium, manganese, molybdenum, neodymium, nickel, niobium, silicon, tin, titanium, vanadium and zinc; and solid solutions having a corundum-hematite crystalline structure comprising chrome oxide a host component doped with guest elements selected from aluminum, antimony, bismuth, boron, cobalt, gallium, indium, iron, lanthanum, lithium, magnesium, manganese, molybdenum, neodymium, nickel, niobium, silicon, tin, titanium, vanadium and zinc.

34. A non-visible authentication mark comprising a laser mark disposed between a substrate and a cover coating layer that covers the laser mark and at least a portion of the substrate surrounding the laser mark, wherein the laser mark comprises an infrared reflective inorganic pigment and the cover coating layer comprises an inorganic pigment that is different than the infrared reflective inorganic pigment in the laser mark, wherein the cover coating layer is in the form of a film selected from the group consisting of paint films, porcelain enamel coating films, glass enamel coating films, extruded plastic films and laminated plastic films, wherein the infrared reflective inorganic pigment in the laser mark causes the laser mark to reflect radiation at a predetermined wavelength within the range of from about 0.75 μm to about 40 μm at a sufficiently different level than the substrate covered by the cover coating layer, and wherein the cover coating layer appears substantially opaque in the visible portion of the electromagnetic spectrum such that it conceals the laser mark covered by the cover coat in the visible portion of the electromagnetic spectrum but is sufficiently transmissive of radiation emitted at the predetermined wavelength that the laser mark can be discerned from the substrate through the cover coating layer at the predetermined wavelength.

35. An article marked with a non-visible authentication mark comprising a laser mark disposed between a surface of the article and a cover coating layer that covers the laser mark and at least a portion of the substrate surrounding the laser mark, wherein the laser mark comprises an infrared reflective inorganic pigment and the cover coating layer comprises an inorganic pigment that is different than the infrared reflective inorganic pigment in the laser mark, wherein the cover coating layer is in the form of a film selected from the group consisting of paint films, porcelain enamel coating films, glass enamel coating films, extruded plastic films and laminated plastic films, wherein the infrared reflective inorganic pigment in the laser mark causes the laser mark to reflect radiation at a predetermined wavelength within the range of from about 0.75 μm to about 40 μm at a sufficiently different level than the surface of the article beneath the cover coating adjacent to the laser mark, and wherein the cover coating layer appears substantially opaque in the visible portion of the electromagnetic spectrum such that it conceals the laser mark covered by the cover coat in the visible portion of the electromagnetic spectrum but is sufficiently transmissive of radiation emitted at the predetermined wavelength that the laser mark can be discerned from the surface of the article beneath the cover coating adjacent to the laser mark through the cover coating layer at the predetermined wavelength.

* * * * *